(12) United States Patent
Fadavi-Ardekani et al.

(10) Patent No.: US 6,842,844 B1
(45) Date of Patent: Jan. 11, 2005

(54) PARAMETER MEMORY FOR HARDWARE ACCELERATOR

(75) Inventors: Jalil Fadavi-Ardekani, Newport, CA (US); Walter G. Soto, Irvine, CA (US); Wayne Xin, Aliso Viejo, CA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/512,511

(22) Filed: Feb. 24, 2000

(51) Int. Cl.[7] .................. G06F 13/40; G06F 15/17; G06F 15/177
(52) U.S. Cl. .................. 712/36; 712/35; 725/87; 725/111; 711/147; 711/170
(58) Field of Search ..................... 712/35, 36, 34, 712/43, 27; 725/87, 89, 111; 711/147, 170, 158; 714/711, 784, 781; 709/227, 233

(56) References Cited

U.S. PATENT DOCUMENTS

| 4,839,851 | A | * | 6/1989 | Maki ........................... 712/43 |
| 5,754,556 | A | * | 5/1998 | Ramseyer et al. .......... 714/711 |
| 5,883,907 | A | * | 3/1999 | Hoekstra .................... 714/784 |
| 6,415,369 | B1 | * | 7/2002 | Chodnekar et al. ......... 711/158 |
| 6,704,871 | B1 | * | 3/2004 | Kaplan et al. .............. 713/192 |

* cited by examiner

Primary Examiner—Daniel H. Pan

(57) ABSTRACT

The present invention provides a hardware accelerator of a DSP with a parameter RAM memory for storing the parameters required for the various operating conditions of the accelerator. The hardware accelerator can easily and without modification accommodate design changes such as the need to support additional ADSL lines.

7 Claims, 2 Drawing Sheets

US 6,842,844 B1

PARAMETER MEMORY FOR HARDWARE ACCELERATOR

FIELD OF THE INVENTION

The present invention relates to digital signal processors. More particularly, the invention relates to storage of operating conditions and parameters for plural asymmetric digital subscriber line (ADSL) processors in a digital signal processor.

DESCRIPTION OF THE RELATED ART

With the explosion of the Internet and the growing availability of high bandwidth communication services such as video-on-demand, digital TV broadcast, teleconferencing, and the like, high-speed data options are increasingly being offered by telecommunication network providers to their customers. Fiber optic cables, the transmission medium of choice for high-speed data communications, is not readily available; therefore, alternatives have been developed which allow high-speed data communications to be provided over existing twisted-pair copper wire connections that are currently in place.

A commonly-used high-speed, high bandwidth option is the ADSL (Asymmetric Digital Subscriber Line). ADSL's can provide very high data speeds such as on the order of several megabits per second over a standard twisted wire pair. ADSL is so-named because of the asymmetric manner is which it transmits and receives data: the data rate in one direction, e.g., from the central switching office of a network provider to a customer's premises, is much higher than the data rate in the other direction, e.g., from the customer's premises to the central switching office. ADSL's allow, among other things, for the bandwidth of a Digital Subscriber Line (DSL) to be subdivided so that one portion of the bandwidth may be used for voice communications while another portion may be used for data transmission.

A digital signal processor (DSP) is a microprocessor specifically designed for processing digital signals and is required for digital communications over DSLs. With the proliferation of digital circuits and applications utilizing digital processing, DSP's are used in many different digital applications. Recently, DSPs have been developed which incorporate dedicated hardware accelerators to perform what are traditionally MIPS (millions of instructions per second) intensive tasks. One example of such a DSP is the DSP16270 manufactured by Lucent Technologies.

FIG. 1 illustrates a simplified block diagram of the Lucent DSP16270. A hardware accelerator 130 is connected to a peripheral bus 105 and also to a plurality of buffers 112, 114, 116, and parameter registeri 118. In a known manner, buffers 112, 114, 116, and parameter register 118 transfer data to and from the hardware accelerator 130. For example, in the Lucent DSP 16270, hardware accelerator 130 can comprise a Framer/CodertInterleaver (FCI) hardware accelerator and buffers 112, 114, and 116 can comprise a frame buffer, interleave buffer, and code word FIFO buffer, respectively. In this configuration, frame buffer 112 is used in a ping-pong fashion to transfer unframed bearer channel data between hardware accelerator 130 and external network interface block 110. Interleave buffer 114 transfers frame coded and possibly interleaved data frames between the hardware accelerator 130 and the DSP core 122. Finally, code word FIFO buffer 116 provides temporary storage of data for use by, for example, a Reed-Solomon encoder (not shown).

A parameter register block 118 comprises a set of registers which temporarily store operating conditions and parameters related to the control of the various operations performed by the hardware accelerator 130. These parameters can be either pre-stored initialization parameters programmed by the DSP and input to parameter register block 118 when needed (e.g., parameters related to the mode of the ADSL lines, interleave depth, number of errors to be corrected, etc.) or variable parameters which may change from frame to frame and which are uploaded to the parameter register block when they become available (e.g., parameters from previous sessions, CRC values, etc.). Prior art systems use registers for temporary storage of these operating parameters and conditions because, on a per-session basis, they are relatively small in size, operate relatively quickly, and are relatively easy to interface with the rest of the system. The hardware accelerator 130 includes internal parameter registers (not shown) which receive the data pertaining to the operating conditions and parameters for each enabled ADSL line from parameter register block 118. The parameters for each ADSL line may include information relating to data rate, error correction code word lengths, maximum number of errors that can be corrected per code word, interleave/deinterleave depths, protocol modes, etc. In the Lucent DSP 16270, at least 93 different parameters (e.g., 93 RAM words) may be required for each ADSL line. If the hardware accelerator is designed to support four ADSL lines, then four sets of registers are required to store the necessary parameters, as shown in FIG. 1.

The hardware accelerator 130 (e.g., an FCI) interfaces with an ATM accelerator (not shown) through the frame buffer 112. The hardware accelerator 130 supports multiple ADSL sessions and performs various tasks on data including: framing/de-framing, cyclic redundancy code generation and checking (CRCing), scrambling/de-scrambling, Reed-Solomon encoding/decoding, and interleaving/de-interleaving. The hardware accelerator 130 may also provide Network Timing Reference generation and insertion, Interleave and Fast Path support, and access to its internal state and data in support of a test methodology using the DSP core as smart test controller. All functionalities of the hardware accelerator 130 are provided as per ADSL standards and do not constitute the invention herein.

A problem with the above-described sysytem is that each of the registers in parameter register block 118 are extremely large. For example, to support 93 parameters in 16 bit registers, approximately 1,500 flip-flops are needed per ADSL line. In addition, a change of design requirements, e.g., the need to be able to support additional ADSL lines, requires that an entire register be added to the parameter register block for each additional ADSL line.

Accordingly, a need exists for a method and apparatus which can more efficiently store the operating conditions and parameters for each enabled ADSL line and which can easily accommodate additional lines that may be required due to design change requirements.

SUMMARY OR THE INVENTION

The invention is a hardware accelerator of a DSP provided with a parameter RAM memory for storing the parameters required for the various operating conditions of the accelerator. The DSP can easily and without hardware modification accommodate design changes such as the need to support additional ADSL lines.

More particularly, the invention is a digital signal processor (DSP), comprising a a hardware accelerator and a parameter RAM coupled to the hardware accelerator, the parameter RAM storing operating condition parameters for use by the hardware accelerator. In a preferred embodiment, the DSP is used in connection with a communication system employing plural ADSL lines, and the parameter RAM is configurable to store operating condition parameters for each of the plurality of ADSL lines.

DESCRIPTION OF PREFERRED EMBODIMENT

Figure 1:
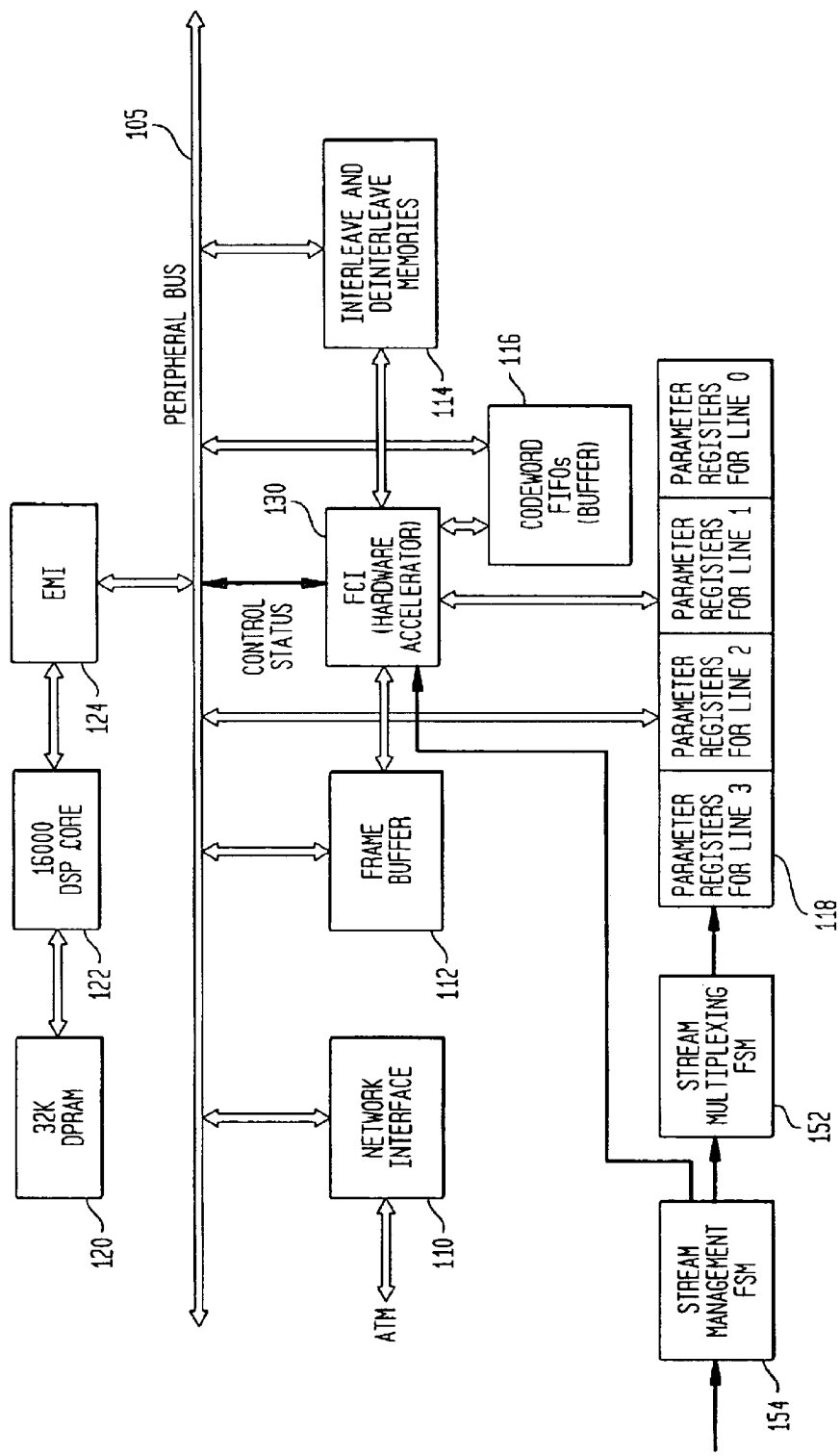
FIG. 1 is a block diagram of a digital signal processor illustrating a prior art method of storing parameter and operating condition information.
Figure 2:
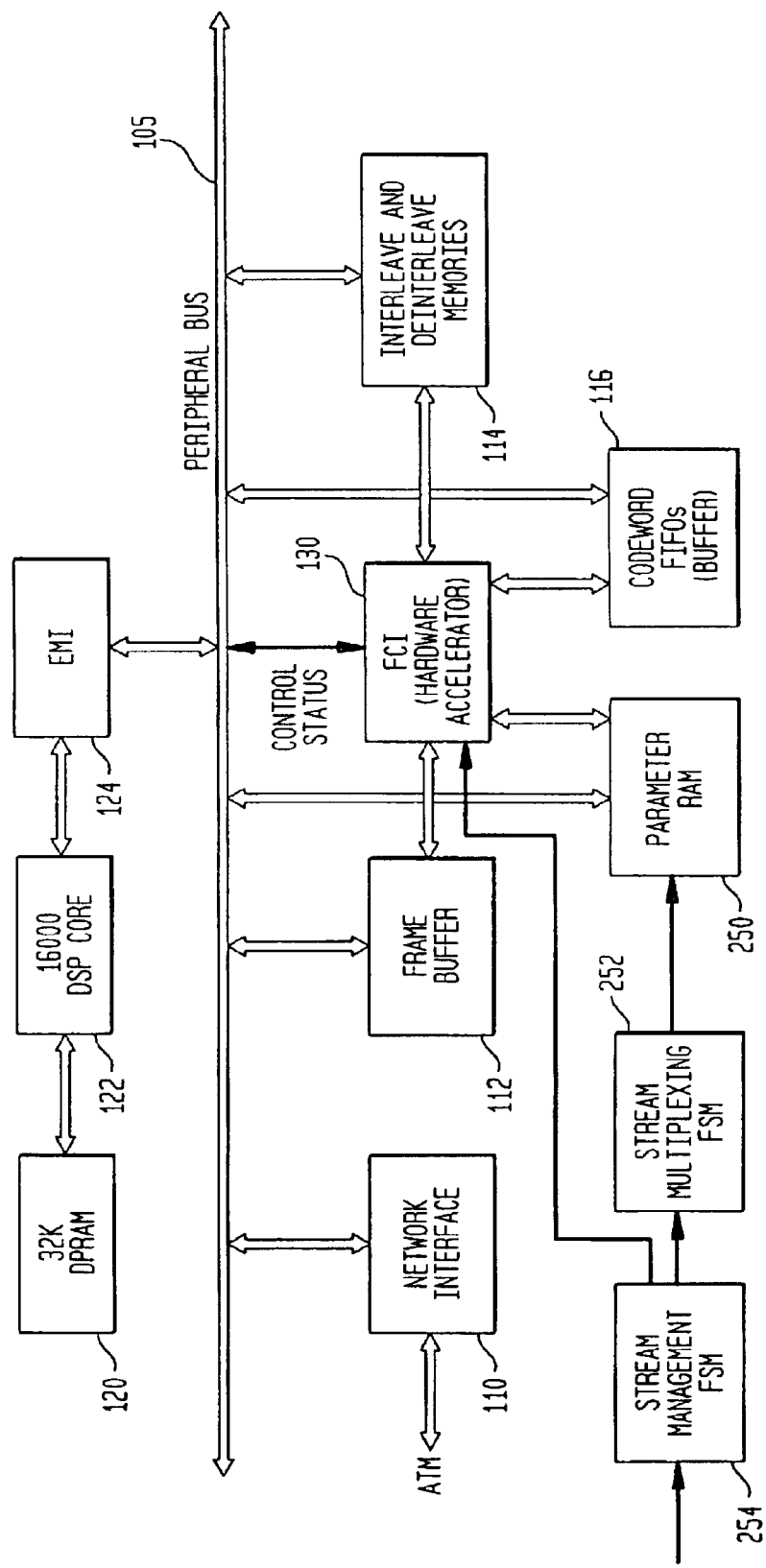
FIG. 2 is a block diagram of a digital signal processor illustrating the parameter and operating-condition storage method of the present invention.

FIG. 2 illustrates a block diagram of the present invention. As shown in FIG. 2, the present invention includes a parameter RAM 250 connected to a peripheral bus so that it can communicate over the peripheral bus with a hardware accelerator 230.

In a preferred embodiment, the parameter RAM 250 comprises a 1K×16 bit RAM, which is large enough to support multiple (e.g., 8) ADSL lines under current design parameters. It is understood, however, that the size of RAM 250 is not limited in any way and can be any size depending on the needs of the user.

Parameter RAM 250 stores the state information for each of the transmit and receive paths and is divided into separate transmit and receive regions. For a system requiring 4 ADSL lines, the transmit and receive regions are each further subdivided into 4 blocks, one per modem session. An example of this mapping is shown in Table 1 below. In addition to stage storage, the program registers for each session can be mapped into parameter RAM 250. The parameter RAM 250 is also fully accessible by the DSP so that the DSP can be utilized for programming of the ADSL lines.

TABLE 1

| Address Range | Size | Mnemonic | Description |
|---|---|---|---|
| 0X0000–0X007F | 128 | TX0 | Tx line 0 registers and state storage |
| 0X0080–0X00FF | 128 | TX1 | Tx line 1 registers and state storage |
| 0X0100–0X017F | 128 | TX2 | Tx line 2 registers and state storage |
| 0X0180–0X01FF | 128 | TX3 | Tx line 3 registers and state storage |
| 0X0200–0X027F | 128 | RX0 | Rx line 0 registers and state storage |
| 0X0280–0X02FF | 128 | RX1 | Rx line 1 registers and state storage |
| 0X0300–0X037F | 128 | RX2 | Rx line 2 registers and stage storage |
| 0X0380–0X03FF | 128 | RX3 | Rx line 3 registers and state storage |

TABLE 1

Each processing block (e.g., the Framer, the Interleaver, the Encoder, etc.) has the ability to load/store its internal state to/from the parameter RAM 250. The state data is accessed via a common data bus (e.g., a 16-bit data bus). Common load and store signals are connected to each processing block which are combined with a state address to access the state data.

A stream multiplexing finite state machine (FSM) 252 controls the state load and store operation in a known manner. In response to a "line processing complete" indicator from a stream management FSM 254 (which directs and manages data flow in the device), the stream multiplexing FSM 252 (which controls the loading to and from the parameter RAM 250) first stores the ending state of each processed line after a given line processing is done, then loads the starting state for the next enabled line. The state machines sequence the state address and the state load/store control signals to perform the appropriate operations. The stream management FSM 254 indicates to the stream multiplexing FSM 252 which line states to load and store. In a known manner, these state machines provide control over the data flow from hardware accelerator 230.

In operation, in the beginning of the processing for each ADSL line, the acceleratbr first loads the parameters from parameter RAM 250 into the internal parameter registers, counters, state machines, etc., of the hardware accelerator 230. The appropriate computations then take place in the hardware accelerator 230. After the processing is complete, the parameters are restored back from the internal parameter registers of hardware accelerator 230 to the parameter RAM 250. Thus, the circuit need only have a single parameter RAM 250 for supporting multiple ADSL lines, rather than the multiple-register parameter register block of the prior art. By replacing the parameter register ru block with the parameter RAM 250, upgrading to support additional ADSL lines simply involves allocating the addresses of parameter RAM 250 to support the additional lines or, if necessary, replacing parameter RAM 250 with a larger RAM. In either case, this solution is superior to having to add additional parameter registers to accommodate the additional lines.

The specific manner of connecting the parameter RAM 250 to the hardware accelerator 200 is well within the knowledge of one of ordinary skill in the art and is not the focus of the invention; rather, the novelty of the present invention lies in the use of a parameter RAM instead of a parameter register block to provide the appropriate operating parameters to the accelerator. Use of the parameter RAM reduces the overall size of the accelerator in which it is used and renders the accelerator design relatively unaffected by changes in its design requirements.

Although the present invention has been described with respect to a specific preferred embodiment thereof, various changes and modifications may be suggested to one skilled in the art and is intended that the present invention encompass such changes and modifications as fall within the scope of the appended claims.

We claim:

1. A digital signal processor (DSP) used in connection with a communication system employing piural ADSL lines, comprising:

a hardware accelerator; and a parameter RAM coupled to said hardware accelerator, said parameter RAM adapted to exclusively store data for populating variables of programming instructions for use in programrning instructions stored elsewhere and used by said hardware accelerator wherein said DSP is used in connection with a communication system employing plural ADSL lines, and wherein said parameter RAM is selectively configurable to store operating condition parameters for each of said plurality of ADSL lines.

2. The DSP as set forth in claim 1, wherein said parameter RAM comprises a 1K×16 bit RAM.

3. The DSP as set forth in claim 1, wherein said parameter RAM is selectively configurable to store operating conditions for up to at least eight ADSL lines.

4. The DSP as set forth in claim 1, wherein said parameter RAM is selsctively configurable to allocate sufficient memory per ADSL line to support each ADSL line employed.

5. The DSP as set forth in claim 1, wherein said DSP is used in connection with a communication system employing plural ADSL lines, and wherein said parameter RAM is configured to store operating condition parameters for each of said plurality of ADSL lines.

6. The DSP as set forth in claim 5, wherein said parameter RAM is selectively configured to store operating conditions for up to at least eight ADSL lines.

7. The DSP as set forth in claim 5, wherein said parameter RAM is selectively configured to allocate sufficient memory per ADSL line to support each ADSL line employed.

* * * * *